United States Patent [19]
Langlie et al.

[11] 3,904,932
[45] Sept. 9, 1975

[54] METHOD AND APPARATUS FOR PROTECTING ELECTRIC FENCES FROM LIGHTNING

[76] Inventors: Howard Langlie; Albert T. Berg, Jr., both of Ellendale, Minn. 56026

[22] Filed: Mar. 20, 1974

[21] Appl. No.: 452,688

[52] U.S. Cl. .................. 317/61; 174/2; 174/7; 317/61.5; 324/122
[51] Int. Cl.² ............................................. H02H 9/06
[58] Field of Search ............ 256/10; 174/7, 6, 2, 3; 340/254; 324/102, 122; 317/61, 61.5

[56] References Cited
UNITED STATES PATENTS

| | | | |
|---|---|---|---|
| 3,274,447 | 9/1966 | Nelson | 317/61 |
| 3,364,424 | 1/1968 | Berg et al. | 324/72.5 |

*Primary Examiner*—James D. Trammell
*Attorney, Agent, or Firm*—Stuart R. Peterson

[57] ABSTRACT

The adjustable air gap of an electric fence tester is increased sufficiently so that arcing does not occur from the electric fence wire through the tester to ground during the normal operation of the fence, the tester then being left unattended so that protection from lightning is provided until the tester is again needed for fence testing purposes.

10 Claims, 5 Drawing Figures

PATENTED SEP 9 1975 3,904,932
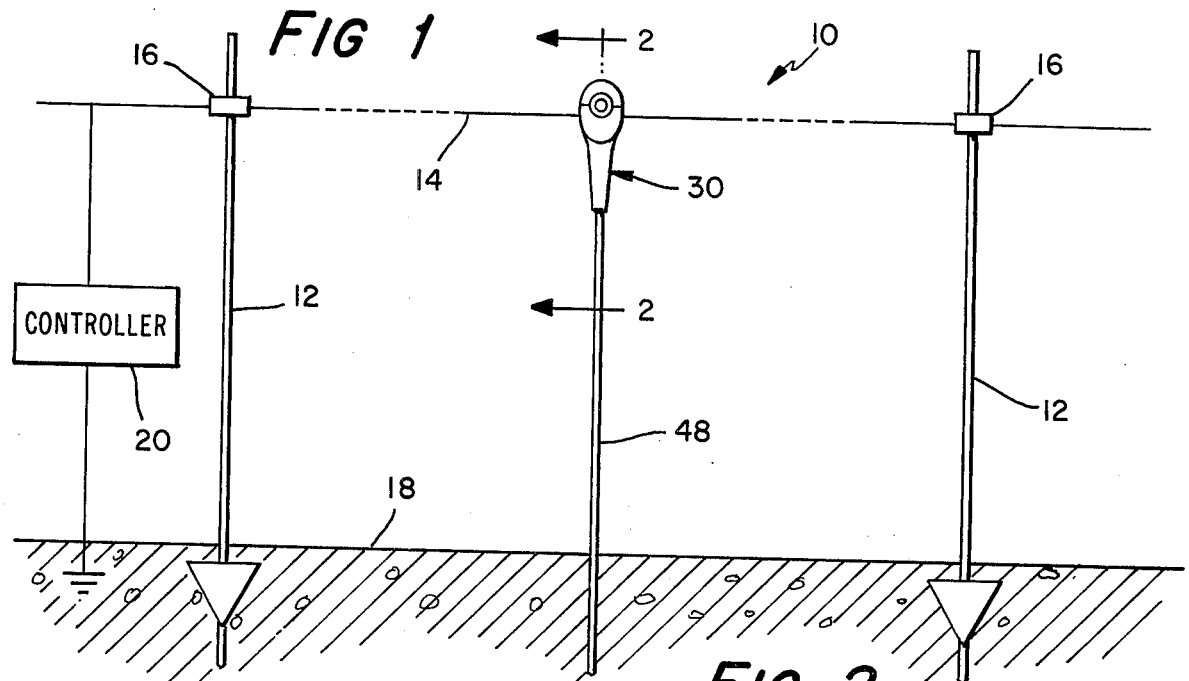
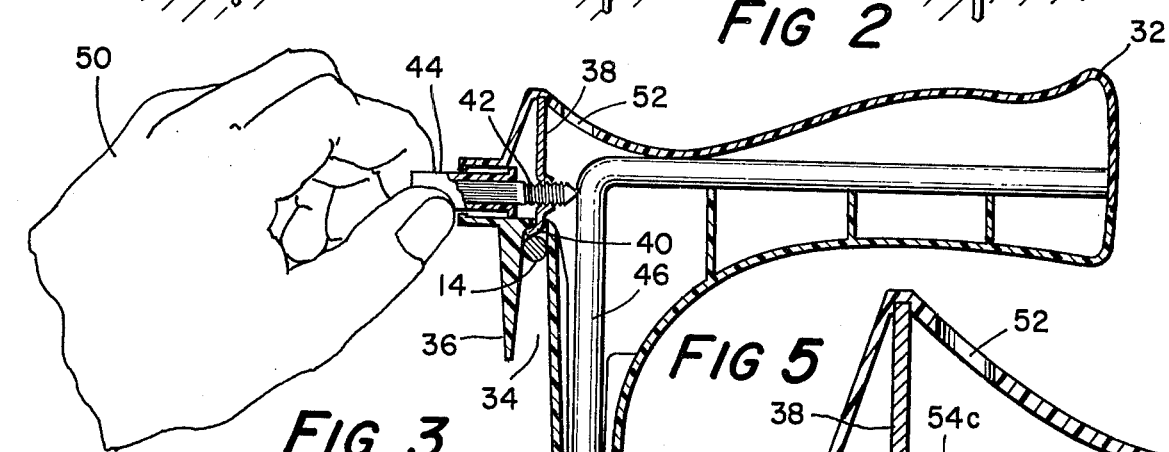
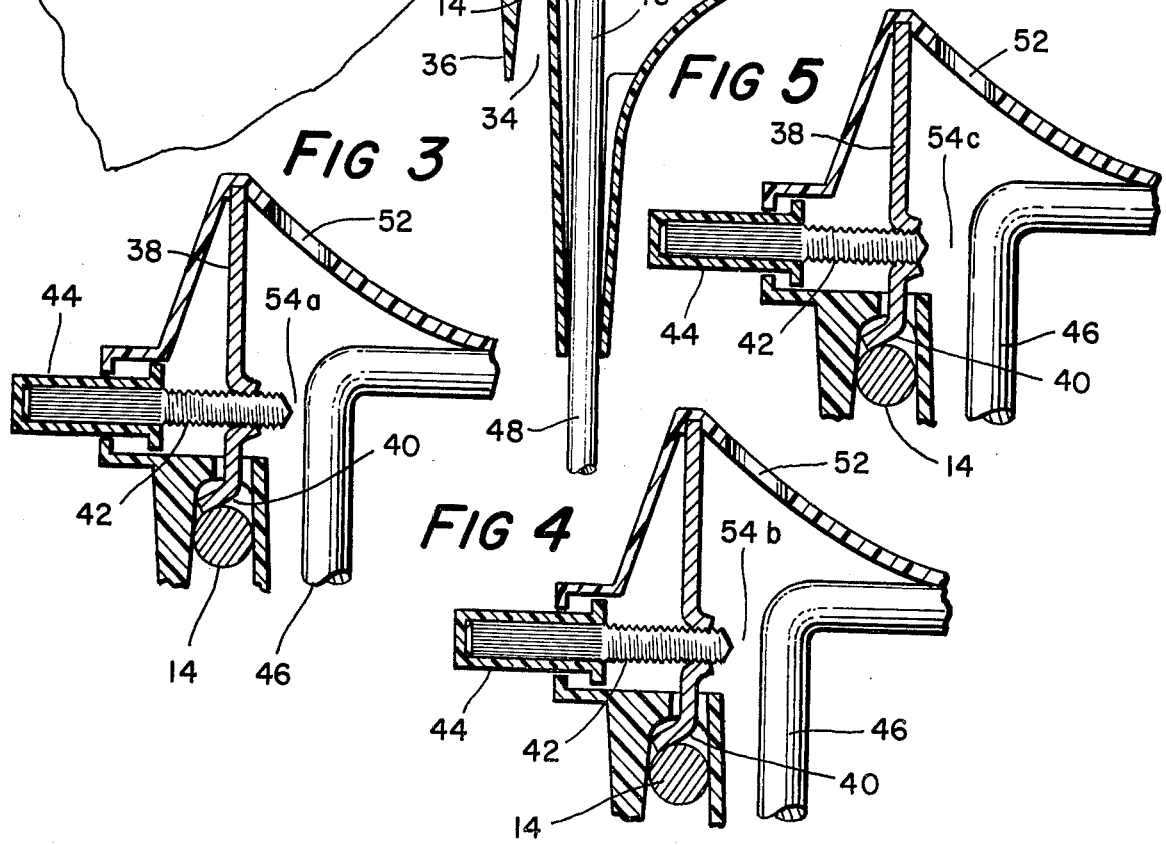

METHOD AND APPARATUS FOR PROTECTING ELECTRIC FENCES FROM LIGHTNING

Background of the Invention

1. Field of the Invention

This invention relates generally to electric fences, and pertains more particularly to a method and apparatus for protecting such fences from lightning.

2. Description of the Prior Art

Various ways have been devised for protecting non-electric fences from abnormally high voltages, such as those occasioned when lightning strikes the fence. The problem is rather minimal if metallic posts are utilized for supporting the fence wire because then the entire fence is gounded through the posts. The problem is not unduly severe even if wooden posts are employed.

The problem really arises, however, in connection with electric fences, for the electric fence wire must be insulated from ground because of the high voltage pulses supplied thereto by the controller. It is generally well known that the magnitude of the voltage pulses must be such as to provide a source of irritation to any animal that might brush up against the electric fence wire. The voltage magnitude of such electric pulses is not nearly as high as the transient voltages derived from lightning.

Of course, conventional lightning arresters, such as the aluminum-cell type, the oxide-film type, Thyrite and others can be utilized. While such arresters are not unduly costly, nonetheless they are sufficiently bothersome to install or connect so that the usual practice is not to bother with any form of lightning protection. Where the electric fence is portable or of the knockdown type, then the use of lightning arresters becomes even more bothersome, and lightning protection is apt to be ignored to even a greater degree.

SUMMARY OF THE INVENTION

Accordingly, a need exists for a simple device and method for protecting an electric fence against lightning. In this regard, an object of the invention is to make use of an electric fence tester of the air gap type for protecting the fence against lightning when the tester is not needed for testing the operational condition of the fence. Thus, when following the teachings of our invention, no added investment is required over and above the cost of the fence tester itself, which entails only a rather minimal investment in the first place.

Another object of the invention is to provide a means for protecting an electric fence against lightning which does not require any mechanical attachment to the fence. In this regard, all that need be done is to make certain that contact is made between the tester and the electric fence wire and of course between the tester and ground. A simple adjustment of the tester then permits it to be employed as a lightning arrester. When the tester is to be used again for testing purposes, the user need only pick up the tester without having to resort to any detaching procedure. More specifically, the contact that engages the electric fence wire bears gravitationally downwardly on the fence without any mechanical attachment being needed.

Another object is to provide a lightning arrester that will resist shifting and electrical disengagement from the fence wire. The particular fence tester that is proposed for use in the method herein described has a downwardly facing notch which minimizes any tendency for the upper end of the tester to shift laterally. Additionally, the rod portion of the tester can be pressed into the ground sufficiently to aid in maintaining contact with the fence wire. Consequently, the tester will remain in a relatively fixed relationship with the fence so that it provides excellent protection at all times, even where high wind velocities are apt to be encountered.

Briefly, our invention embodies the utilization of an electric fence tester comprised of an electrically conductive member for engaging the electric fence wire, an electrically conductive rod member that can be pressed into the ground, and a contact member threadedly carried on the member that engages the electric fence wire, the contact member being movable toward and retractable away from the rod member to draw an arc when it is being used as a tester. In practicing our invention, however, the threaded contact member is retracted farther than necessary so that no arc exists. The separation or spacing can be readily determined by backing off the threaded contact member so that the arc, although initially established, becomes extinguished.

To assure that the fence will remain operable even when atmospheric conditions have become quite humid, a slightly greater retraction is resorted to so that even when the humidity increases substantially, the normal operation of the electric fence will not be adversely affected. Consequently, the gap or spacing can be properly adjusted so that adequate protection for the fence is furnished.

Thus, the tester can be very quickly made suitable for use as a lightning arrester, yet when it is to be used again for testing the operation of the fence itself, all that the user need do is to draw an arc and he will then know that the fence is operational. If the tester is to be removed or used for testing an isolated section of the fence, or a different electric fence, all that the user has to do is pick up the tester and move it to the new testing location.

BRIEF DESCRIPTION OF THE DRAWINGS

FIG. 1 is an elevational view of a typical electrical fence section comprising two round metal posts having an electric fence wire extending therebetween with an electric fence tester being used as a lightning arrester;

FIG. 2 is a sectional view taken in the direction of line 2—2 of FIG. 1 but with the fence tester adjusted so that the electric fence wire is grounded through the tester;

FIG. 3 is a fragmentary detail corresponding to FIG. 3 but with the threaded contact member retracted only sufficiently to draw an electric arc;

FIG. 4 is a view corresponding to FIG. 3 but with the threaded contact member further retracted so that the arc has become extinguished, and FIG. 5 is still another view, this view depicting a more retracted position of the threaded contact member than in FIG. 4 so that assurance is provided that an electric arc will not be reestablished by reason of increased humidity conditions.

DESCRIPTION OF THE PREFERRED EMBODIMENT

In FIG. 1 a section of an electric fence 10 has been illustrated. Such fences can assume a variety of forms. For the sake of drafting simplicity, the electric fence 10 has been pictured with a pair of round metal posts 12 to which is attached an electric fence wire 14. Various types of electric fence insulators 16 can be used for holding the wire 14 in place on the posts 12. An example of a suitable insulator is described in our U.S. Pat. No. 3,749,820, issued May 18, 1973, titled "Electric Fence Insulator." The posts 12, quite obviously, have their lower ends embedded in the ground 18. An electric controller 20 has been shown which is connected between the electric fence wire 14 and the ground 18. The controller simply provides a sequence of high voltage pulses having a sufficient magnitude or value that cattle will be discouraged from coming in contact with the electric fence wire 14.

Referring now to the electric fence tester shown in FIG. 1, it will be discerned that this tester has been denoted in its entirety by the reference numeral 30. While a sufficient description of the tester 30 will be given herein so that the present invention can be comprehended, it can be pointed out that the tester is shown and described in greater detail in our U.S. Pat. No. 3,364,424, issued on Jan. 16, 1968 for "Electric Fence Testing Device Utilizing an Air Gap."

From FIG. 2, it will be perceived that the tester 30 includes a hollow dielectric handle 32 having a downwardly facing notch at 34, there being a lip or tongue 36 that forms one side of the notch. Extending upwardly from the top of the notch 34 is an electrically conductive member 38 in the form of a small plate that has a downwardly extending tongue 40 integral therewith. The lower edge of the tongue 40 is designed to contact the upper side of the electric fence wire 14. The member 38 is suitably held within the handle 32. Further, it carries a threaded contact member 42 having a dielectric knob 44 thereon by means of which the contact member 42 can be advanced and retracted.

The upper end of an L-shaped rod 46 is housed within the handle 32 and is engaged by the threaded contact 42 when it is rotated sufficiently so as to move the right end into engagement with the rod 46. Such an engaged condition is shown in FIG. 2. The L-shaped rod 46 has a straight shank portion 48 that is of sufficient length so that engagement with the ground 18 can be readily effected. From FIG. 1 it will be seen that the lower end of the L-shaped rod is actually embedded in the ground 18. More will be said shortly concerning the advantage to be derived from having the lowermost section embedded as just mentioned.

As far as practicing the invention is concerned, a person's hand 50 has been shown in FIG. 2. Thus, the thumb and first finger is depicted in a grasping relationship with the knob 44. It will be assumed, and the view actually shows this, that the hand 50 has been used to twist the knob 44, and hence the threaded contact member 42 in a direction so as to cause the contact member 42 to engage the L-shaped member 46. This is a preliminary condition as far as the practicing of our invention is concerned. It has the effect, though, of shorting the electric fence wire 14 to ground 18, doing so through the tongue 40 and plate member 38, the threaded contact member 42 and the L-shaped rod 46, the lower portion of the shank 48 extending downwardly into the ground 18. This condition would normally exist when the tester 30 is to be employed as a tester, for under these conditions it simply shorts out the controller 20 so that the fence 10 can be worked on. However, it also serves as a starting point for describing out present invention.

Assuming now that the user rotates the knob 44 so as to retract the threaded contact member 42, he does so until a slight spacing 54a is produced between the contact member 42 and the L-shaped rod 46, this relationship appearing fragmentarily in FIG. 3. This results in drawing of an arc which can be viewed through the peep hole 52 if the controller 20 is fully operational. Consequently, the user can note the drawing of the arc through the peep hole 52 in the handle 32 and he is immediately apprised of the proper functioning of the controller 20 which supplies pulses at a sufficiently high voltage to discourage animals from brushing against the wire 14.

It is at this stage that our invention is really practiced. From the retracted position of the contact member 42 appearing in FIG. 3, the user then further retracts the contact member 42, producing the relationship pictured in FIG. 4. This creates a spacing 54b between the contact member 42 and the L-shaped rod 46 which is sufficient to extinguish the arc that exists in the condition shown in FIG. 3. The user could leave the fence tester 30 in the relationship shown in FIG. 4, but it is preferable that the contact member 42 be further retracted to the position appearing in FIG. 5. Such an increased separation or spacing 54c assures that the voltage pulses provided by the controller 20 will not cause an arc to be produced even when the humidity increases appreciably, such as when it rains.

With the lower end of the rod 46 embedded in the ground as shown in FIG. 1 and with the notch 34 receiving therein the electric fence wire 14, the fence tester 30 is firmly held in place. The notch 34 by reason of the body of the handle 32 and the downwardly extending lip 36 prevents any lateral shifting of the handle 32 in a direction normal to the fence wire 14. The embedding of the lower end of the shank 48 in the ground 18 further assists in holding the tester 30 in engagement with the fence wire 14 so that it is in readiness should lightning strike the wire 14. If such a situation should occur, it will be recognized that the current discharge will be from the wire 14 upwardly through the tongue 40 and the plate 38. Since the contact member 42 is threadedly carried by the plate 38, the discharge path is continued through the member 42, the air gap or spacing 54c that exists in FIG. 5, and then to the L-shaped rod 46. The discharge current passes down through the metallic rod shank 48 into the ground 18 where it is dissipated.

When the tester 30 is to be used for testing purposes, the relationship depicted in FIG. 2 can again be realized, the person simply twisting the knob 44 so as to cause the contact member 42 to advance into engagement with the L-shaped rod 46. Rotation in an opposite direction as far as the knob 44 is concerned will simply return the contact member 42 to the position it assumes in FIG. 3 with the air gap spacing 54a and the attendant drawing of an arc which is indicative of the proper operation of the controller 20, the arc being readily seen through the hole 52.

Thus, the tester 30 is always in readiness for use in testing the operational characteristics of the electric fence 10 when needed, yet providing an adequate path to ground should lightning strike the wire 14. It should be recognized that the tester 30 can be easily pulled from the ground, that is, its shank 48 withdrawn and the tester used on a different electric fence or can be so removed if the electric fence 10 is to be relocated, such as frequently happens in the temporary penning of cattle.

Consequently, the tester 30, when practicing our invention can be used constantly. When it is not used as a tester, then it can effectively function as a lightning arrester. This advantage is derived without any additional investment. Of course, it should be kept in mind that the cost of the tester 30 is rather minimal to begin with. The rancher or farmer is thereby relieved of purchasing any lightning arresters of a permanent type, and he also avoids any labor costs or time that would be required in installing a permanent lightning arrester. In addition, he has the advantage of complete portability, both as to the use of the fence tester and also as to the relocation of the electric fence 10. Therefore, it should be apparent that our method and the combination of the tester 30 with any electric fence carries with it considerable practical advantage, doing so with a very minimum investment, actually no investment as far as the lightning protection feature is concerned when the user already has a tester of the envisaged type.

We claim:

1. A method of protecting an electric fence from lightning comprising the steps of placing an electric fence tester of the arc gap type on an electric fence wire so that no arc is drawn under normal operating conditions of the electric fence, and permitting said tester to remain in such relation so that the tester then functions as a lightning arrester should lightning strike the fence.

2. A method of utilizing an electric fence tester for protecting an electric fence from lightning in which the tester includes a first electrically conductive member for engaging the electric fence wire, a second electrically conductive member for engaging the ground and a third electrically conductive member threadedly carried by one of said members for relative movement toward and away from the other of said members, the method comprising the steps of placing said first member in contact with the electric fence wire and said second member in contact with the ground, and retracting said third member relative to said other member to provide a sufficient spacing so that the normal operation of the electric fence is not adversely affected in that no electric arc extends between said third member and said other member, whereby when said tester is thereafter left unattended with said first member remaining in contact with the electric fence wire and said second member remaining in contact with the ground said tester then functions as a lightning arrester.

3. A method of protecting an electric fence in accordance with claim 2 in which said one member constitutes said first member, said third member therefore being threadedly carried by said first member.

4. A method of protecting an electric fence in accordance with claim 3 in which said third member is first positioned relatively close to said second member to draw an arc and then retracted to provide said sufficient spacing so that the normal operation of the electric fence is not adversely affected.

5. A method of protecting an electric fence in accordance with claim 4 in which said third member is further retracted so as to compensate for a possible increase in atmospheric humidity.

6. In combination with an electric fence that includes a plurality of posts having their lower ends embedded in the ground and an electric fence wire insulatingly mounted on said posts and extending therebetween, a controller connected between said wire and the ground providing a sequence of high voltage pulses, an electric fence tester having a first electrically conductive member in contact with said electric fence wire, a second electrically conductive member in contact with the ground, in which said post ends are embedded, and a third electrically conductive member contacting one of said members and having a spacing with respect to the other of said members greater than that which would cause an arc to be produced by the high voltage pulses provided by said controller, whereby the normal operation of the fence is not adversely affected and whereby an electric discharge can flow when said electric fence wire is struck by lightning.

7. The combination of claim 6 in which said tester includes a dielectric handle having a downwardly facing notch, said first electrically conductive member being located adjacent the upper end of said notch, so that said notch resists lateral shifting of the tester when left unattended.

8. The combination of claim 7 in which said second electrically conductive member constitutes a rod extending downwardly from said handle, the lower end portion of said rod being embedded in the ground to further resist shifting of the tester.

9. A method of protecting an electric fence in accordance with claim 4 in which said third member is again positioned relatively close to said second member to draw an arc to test said electric fence and then once again retracted to provide said sufficient spacing so that the normal operation of the electric fence is not adversely affected when the electric fence tester is again left unattended with said first member remaining in contact with the electric fence wire and said second member remaining in contact with the ground to function once again as a lightning arrester until again needed as a fence tester.

10. The combination of claim 8 in which said embedded end portion is embedded to substantially the same depth as said posts.

* * * * *